Jan. 31, 1956     L. SIMONSEN     2,733,100

GRASS CUTTING MEANS FOR STATIONARY LAWN SPRINKLER

Filed Oct. 19, 1953

Leif Simonsen
INVENTOR.

BY *Clarence A. O'Brien*
*and Harvey B. Jacobson*
Attorneys

United States Patent Office 2,733,100
Patented Jan. 31, 1956

2,733,100

GRASS CUTTING MEANS FOR STATIONARY LAWN SPRINKLER

Leif Simonsen, Los Angeles, Calif.

Application October 19, 1953, Serial No. 386,735

2 Claims. (Cl. 299—60)

The present invention relates to novel and improved ways and means whereby long and overhanging blades of grass may be satisfactorily and effectively trimmed from the immediate location of a stationary or embedded-type lawn sprinkler head.

It is generally well known that matted and long grass growing within the immediate vicinity of an embedded lawn sprinkler head or nozzle interferes with effective sprinkling results. Under these circumstances special hand tools and implements have been devised for trimming the stated grass and, for the most part, these devices have been contrived for manual use. They are of many and varied styles and forms and are characterized generally by handle-equipped bladed cutting means.

The present invention has to do with a novel distinct construction which is possessed of features of refinement and improvement, is simple and economical, and constitutes effective means in which manufacturers, retailers and users will find their respective requirements and needs fully met.

Another object of the invention is to provide an aptly suitable construction wherein a simple circular cup is secured to the embedded sprinkler head, said cup serving as a stationary shearing or cutter unit and constituting an anvil-like base for a complemental rotary cutter unit, the latter being independent of said cup and having handle means and frame means, said frame means being provided with insertable and removable cutting elements or blades which telescope into a cooperating upper portion of the cup.

More specifically, novelty is predicated upon the readily applicable and removable manually rotatable cutter unit, the latter being characterized by a sturdy seating ring having depending cutter blades, said ring being provided with an appropriate yoke and said yoke having a convenient and well balanced handle attached thereto.

Other objects and advantages will become more readily apparent from the following description and the accompanying sheet of illustrative drawings.

In the drawings, wherein like numerals are employed to designate like parts throughout the views.

Figure 1:
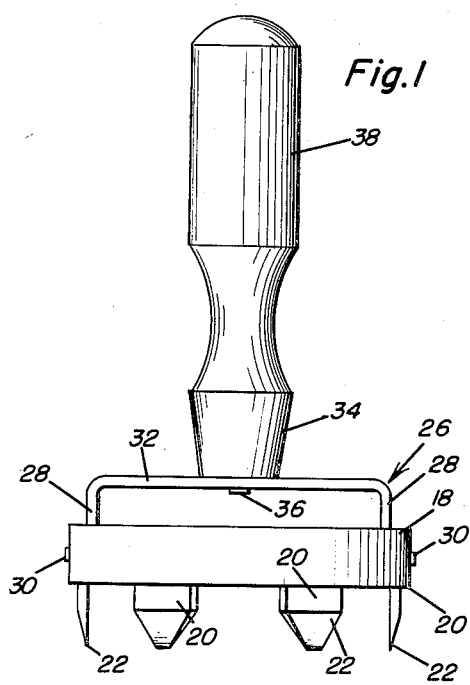
Figure 1 is an elevational view of the rotary bladed cutter unit.
Figure 2:
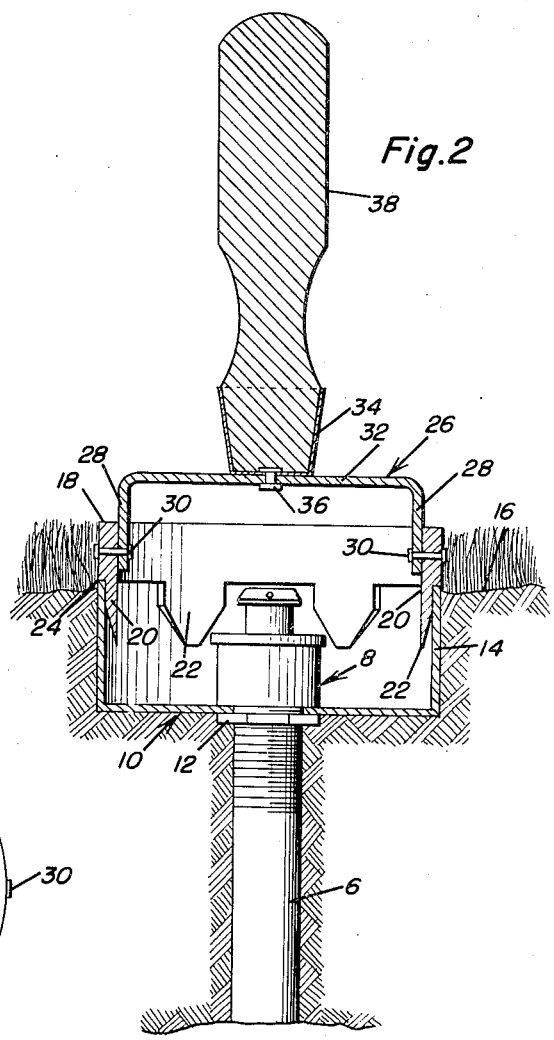
Figure 2 is a view in section and elevation showing the embedded sprinkler head, the shearing cup secured thereto, and the rotary cutter unit mated with the cup in grass cutting and trimming relationship.
Figure 3:
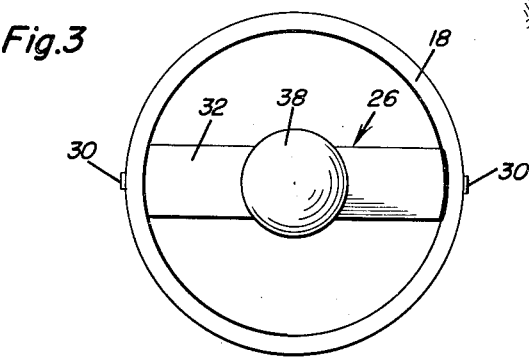
Figure 3 is a top plan view of the unit shown in Figure 1.
Figure 4:
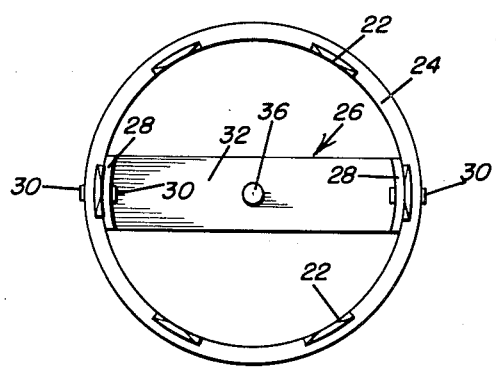
Figure 4 is a bottom plan view of the same.

Reference is had first to Figure 2 wherein the water delivery pipe of the sprinkler system is denoted by the numeral 6. This is embedded in the ground as shown and is provided with a suitable sprinkler head or nozzle 8.

The relatively stationary cutter unit of the over-all trimmer assembly takes the form of a cylindrical shallow cup and this is denoted by the numeral 10. In applying it the cutter head is removed and the cup is placed in the position shown and the centrally apertured bottom of the cup fits over the pipe and is then clamped in place by a retaining nut 12. The cup has a circular upstanding rim or wall 14 whose upper edge or brim is either flush with or slightly above the surface of the ground 16 as shown. The cup is of course then a stationary part of the sprinkler head means. The relatively applicable and removable rotary cutter unit is of the construction best shown in the other figures. It comprises a relatively heavy annulus or ring 18, the lower edge portion of which is provided with depending circumferentially spaced lugs 20 whose lower end portions are wedge-shaped and fashioned into appropriate cutting blades 22. It will be noticed in Figure 2 that the lugs are offset and that the projecting lower edge portion of the ring overhangs the lugs and provides an endless annular shoulder 24. In practice the cutting blades telescope into the cup 10 and the shoulder rests on the brim of the wall of the cup as disclosed. A U-shaped yoke 26 is provided and the depending arms 28—28 fit into the interior of the rim and are bolted, riveted or otherwise rigidly secured thereto as at 30—30. The bight portion 32 is provided with a ferrule 34 and the latter is securely riveted in place as at 36. The ferrule serves to accommodate the shank portion of the wooden or equivalent centrally disposed handle 38.

It will be seen that the invention, therefore, has to do with a cylindrical basing and anvil-forming and shearing cup removably mounted on and in association with the sprinkler head to surround the sprinkler head in concentric relation, this in conjunction with the manually rotatable especially constructed cutter unit.

It is plain that when the blades are fitted telescopically into the cup in the manner illustrated in Figure 2 all overhanging blades of grass will be cleanly sheared off as the rotary cutter unit is oscillated or turned in respect to the cup. A few turns of the rotary unit will suffice to obtain the desired result.

Minor changes in the shape, size, materials and arrangement of parts may be resorted to in actual practice without departing from the spirit and scope of the invention, as claimed.

Having thus described the invention, what is claimed as new is:

1. For use on an embedded lawn sprinkler head, a cylindrical upwardly opening cup having a centrally apertured bottom wall to accommodate the pipe portion of the stated sprinkler head and permit said cup to be attached to the sprinkler head so that the rim-forming wall of said cup may be positioned substantially flush with the ground surface in a manner to provide a stationary cutter, and a readily applicable and removable manually actuatable cutter complemental to said cup and embodying an open frame structure, the latter comprising a ring the lower edge of which provides a shoulder rotatably contacting the upper edge of said rim-forming wall, the inner peripheral portion of said ring provided with circumferentially spaced depending cutting blades, said cutting blades telescoping into said cup and having movable contact with the inner surface of said rim-forming wall, and handle means operatively connected with said ring.

2. The structure defined in claim 1 wherein said handle means comprises a U-shaped yoke having a bight portion spanning said ring and arms secured at diametrically opposite points to said ring, and an upstanding handle fixed to and rising from said bight portion.

References Cited in the file of this patent

UNITED STATES PATENTS

| 1,064,790 | Tucker | June 17, 1913 |
| 1,765,288 | Schmidt | June 17, 1930 |
| 1,791,957 | Cummings | Feb. 10, 1931 |
| 1,857,383 | Johnson | May 10, 1932 |
| 2,670,537 | Campbell | Mar. 2, 1954 |